US009557737B1

(12) United States Patent
Ferguson et al.

(10) Patent No.: US 9,557,737 B1
(45) Date of Patent: *Jan. 31, 2017

(54) DISTRIBUTION DECISION TREES

(71) Applicant: Google Inc., Mountain View, CA (US)

(72) Inventors: David Ian Franklin Ferguson, Mountain View, CA (US); Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,815

(22) Filed: Oct. 16, 2015

Related U.S. Application Data

(63) Continuation of application No. 14/585,681, filed on Dec. 30, 2014, now Pat. No. 9,187,088.

(60) Provisional application No. 62/037,970, filed on Aug. 15, 2014.

(51) Int. Cl.
*G01C 22/00* (2006.01)
*G05D 1/00* (2006.01)

(52) U.S. Cl.
CPC .......... *G05D 1/0088* (2013.01); *G05D 1/0055* (2013.01)

(58) Field of Classification Search
CPC .... G05D 1/0272; G05D 1/027; G05D 1/0278; G05D 2201/0216; G05D 1/0255; G05D 1/0055
USPC ...................................... 701/27, 23
See application file for complete search history.

(56) References Cited

U.S. PATENT DOCUMENTS

| 7,248,718 | B2 | 7/2007 | Comaniciu et al. |
| 7,346,601 | B2 | 3/2008 | Chaudhuri et al. |
| 7,636,700 | B2 | 12/2009 | Owechko et al. |
| 2011/0004513 | A1 | 1/2011 | Hoffberg et al. |
| 2013/0325241 | A1 | 12/2013 | Lombrozo et al. |

FOREIGN PATENT DOCUMENTS

| EP | 0697541 B1 | 7/1999 |
| EP | 0742381 B1 | 2/2002 |
| EP | 0908644 B | 11/2003 |

*Primary Examiner* — Maceeh Anwari
(74) *Attorney, Agent, or Firm* — McDonnell Boehnen Hulbert & Berghoff LLP

(57) ABSTRACT

The present disclosure is directed to autonomous vehicle having a vehicle control system. The vehicle control system includes a processing system that receives input values that indicate attributes of an object within a threshold distance of the autonomous vehicle and variance values indicating uncertainty associated with the input values. The processing system also provides a plurality of outcomes that are associated with combinations of split decisions. A given split decision indicates whether a particular input value is above or below a threshold value associated with the given split decision. The processing system further determines (i) a probability that the particular input value is above a threshold value and (ii) a probability that the particular input is below the threshold value for a given split decision. Additionally, the processing system determines one or more likelihoods associated with a given outcome. Further, the processing system provides instructions to control the autonomous vehicle.

20 Claims, 7 Drawing Sheets

DISTRIBUTION DECISION TREES

CROSS-REFERENCE TO RELATED APPLICATIONS

This application is a continuation of U.S. patent application Ser. No. 14/585,681 filed Dec. 30, 2014, which claims priority to U.S. Provisional Patent Application No. 62/037,970 filed Aug. 15, 2014, the contents of which are incorporated herein by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present application discloses embodiments that relate to considering uncertainty of sensor measurements when controlling a vehicle. In one aspect, the present application describes a method. The method includes receiving input values that indicate attributes of an object within a threshold distance of the autonomous vehicle and variance values indicating uncertainty associated with the input values. The method also includes providing a plurality of outcomes that are associated with combinations of split decisions. Each split decision indicates whether a particular input value from among the input values is above or below a threshold value associated with the given decision. The method further includes determining, for a given split decision, a probability that the particular input value is above the threshold value and a probability that the particular input value is below the threshold value based on the particular input value and the variance value associated with the particular input value. Additionally, the method includes determining one or more likelihoods associated with the given outcome. The one or more likelihoods are determined based on the determined probabilities associated with the combinations of split decisions indicated by the respective outcomes. Further, the method includes providing instructions executable by a computing device to control an autonomous vehicle based on the one or more likelihoods.

In another aspect, the present application describes a non-transitory computer-readable medium having stored thereon instructions that, upon execution by at least one processor of a computing device, cause the computing device to perform functions. The functions include receiving training data indicative of a plurality of samples. The samples include sets of feature values and respective labels associated with the sets of feature values. A given set of feature values indicates attributes of an object within a threshold distance of the autonomous vehicle. A given label indicates whether or not the object performed a particular action. The functions also include providing a plurality of outcomes. A given outcome is associated with a combination of split decisions. A given split decision indicates whether a particular feature value associated with the given attribute is above or below a threshold value associated with the given split decision. The functions further include determining subsets of the plurality of samples associated with respective outcomes. At least two of the subsets share at least one common sample. Additionally, the functions include determining likelihoods associated with respective outcomes. A given likelihood indicates that the object is performing a particular action. The given likelihood associated with a given outcome is determined based on the labels of the samples in the subset associated with the given outcome. Further, the functions include determining a particular outcome from the plurality of outcomes that corresponds to a set of input value measurements. The set of input value measurements indicates attributes of the object within the threshold distance of the autonomous vehicle. The set of functions also include providing instructions executable by the computing device to control the autonomous vehicle based on the likelihood associated with the particular outcome.

In yet another aspect, the present application describes a system that includes an autonomous vehicle, at least one sensor, a computing device with at least one processor, and a non-transitory computer readable medium. The at least one sensor is configured to determine attributes of an object within a threshold distance of the autonomous vehicle. The non-transitory computer readable medium has stored thereon instructions that, upon execution by the at least one processor, cause the computing device to perform functions. The functions include receiving input values that indicate the attributes of the object within the threshold distance of the autonomous vehicle and variance values indicating uncertainty associated with the input values. The functions also include providing a plurality of outcomes that correspond to combinations of split decisions. Each split decision indicates whether a particular input value meets a criterion associated with the split decision. The functions further include determining, for a given split decision, a probability that the particular input value meets the criterion and a probability that the particular input value does not meet the criterion. Additionally, the functions include determining one or more likelihoods associated with the given outcome. Each likelihood is determined based on the determined probabilities associated with the combination of split decisions indicated by the outcome associated with the likelihood. Further, the functions include providing instructions executable by a computing device to control an autonomous vehicle based on the determined one or more likelihoods.

In another aspect, the present application describes a system. The system includes a means for receiving input values that indicate attributes of an object within a threshold distance of the autonomous vehicle and variance values indicating uncertainty associated with the input values. The system also includes a means for providing a plurality of outcomes that are associated with combinations of split decisions. Each split decision indicates whether a particular input value from among the input values is above or below a threshold value associated with the given decision. The system further includes a means for determining, for a given split decision, a probability that the particular input value is above the threshold value and a probability that the particular input value is below the threshold value based on the particular input value and the variance value associated with the particular input value. Additionally, the system includes a means for determining one or more determining one or more likelihoods associated with the given outcome. The one or more likelihoods are determined based on the determined probabilities associated with the combinations of split decisions indicated by the respective outcomes. Further, the system includes a means for providing instructions executable by a computing device to control an autonomous vehicle based on the one or more likelihoods.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
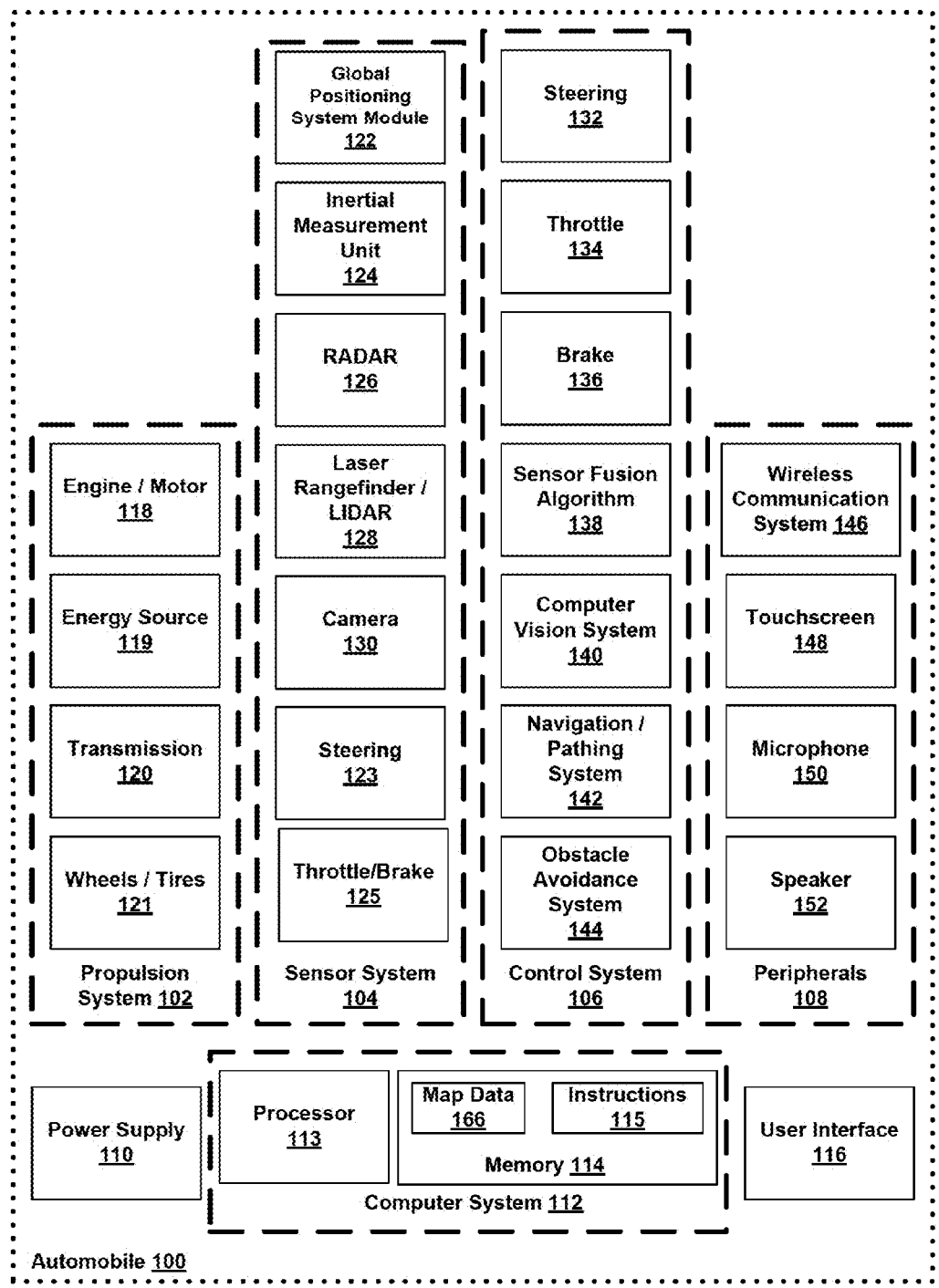
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Decision trees are machine-learning decision support tools that can be used for classification and decision analysis. A decision tree includes decision nodes (which may be referred to herein as "split decisions") that dictate a rule for traversing the decision tree. Each decision node usually has two child nodes attached thereto. For classification, the typical decision tree receives a set of data, and determines a path through the tree from a root node of the tree to a leaf node of the tree by applying the rules of each of the split decisions. A rule (which may be hereinafter referred to as a "split criterion") of a split decision may be a criterion for a feature value in a data set; for example, a split criterion may split on feature value f at a value of v. If f is less than v in a given data set, the data set traverses to the corresponding child node; otherwise, if f is greater than or equal to v in the given data set, the data set traverses to the other child node. The traversal of a data set along a typical decision tree is a "hard" split, such that only one path through the decision tree is considered during evaluation. The traversal through the tree completes when a leaf node is reached, which may be associated with a certain classification for that data set.

Classification using a typical decision tree is useful when input data is known to be accurate; however, noise and other sources of uncertainty in the data might cause inaccurate classification using a typical decision tree. When a certain feature value from input data is very close to a particular split criterion, noise in that input data may cause significant changes in the classification, despite insignificant fluctuations in the feature value.

In some example embodiments, a decision tree considers the uncertainty of feature values by performing a probabilistic inference at the decision nodes. Unlike a typical decision tree, which considers only one path through the decision tree as a result of the "hard" splitting at the decision nodes, a decision tree of the present application determines at the decision nodes the probability that the feature value of an input data set is below the specified criterion or exceeds the specified criterion; in other words, a decision tree of the present application considers multiple paths through the tree and computes probabilities that those multiple paths are the correct path. As a result, an input data set that has a feature value that is close to a split criterion boundary may have a more accurate classification compared to a typical decision tree.

In some example embodiments, a decision tree may be generated or trained using training data. The training data may include a number of samples, where each sample includes values for one or more features values and a label for that sample. Information about the variance and/or standard deviation of the feature values may be determined based on the samples in the training data. During training time, the classifications associated with the leaf nodes of the tree are determined by traversing each sample in the training data through the decision tree until it reaches a leaf node. Typically, a sample traverses along one path, such that it falls into a single leaf node for classification; however, a training process of the present application involves traverses multiple paths through the decision tree for a sample if that sample is close to a certain split criterion (e.g. within one standard deviation of the split criterion). A training process of the present application is described below in further detail.

It should be understood that the following descriptions of operations and structures of the decision trees of the present application refer to a particular example relating to object detection from an autonomous vehicle. However, decision trees may be utilized to a wide variety of applications that takes advantage of machine-learning tools and performs classification, forecasting, and/or prediction. Any other instance where input data may be noisy—or to some extent uncertain—may utilize aspects of the present application to provide more robust classification and more accurate decision making. Other example applications may involve computer vision, recognition of human language in speech or text, searching, data mining, and other kinds of analyses.

An example embodiment involves an autonomous vehicle configured with a sensor system. The sensor system may include sensors, such as a RADAR and a LIDAR configured to measure attributes of an object near the autonomous vehicle. The sensor system may also include a camera configured to capture images, videos, or both images and videos. A computing device or other image processing system may analyze the captured images or videos to determine attributes of an object near the autonomous vehicle. The captured images and video are stored in a memory for processing. Some or all of the captured images may be forward-facing images of a field of view of the vehicle. For example, some of the images captured by the imaging system may resemble the view a driver of the vehicle may see as the driver operates the vehicle. Additional images may capture side and rear views from the vehicle as well. Other sensors may also be present on the vehicle.

A processing system in the autonomous vehicle is configured to determine whether an object is performing a particular action. The processing system receives measured attributes of the object, considers the uncertainty associated with the measured attributes, and determines a likely action that the object is performing at a given time. An object may be a vehicle on a road, such as a car, motorcycle, truck, or bus, among other objects. Measured attributes of an object may include an object's velocity, distance from the autonomous vehicle, distance from the center of a lane in a road, and the object's yaw, pitch, and roll, among other possible measured attributes. Each attribute is measured to within a threshold of certainty, which may be a result of the sensitivity of the sensor or from noise read by the sensor. The attributes of the object may indicate an action being performed by the object, such as the object changing lanes or suddenly braking, among other actions. In some cases, the object may be a pedestrian, and attributes, such as the pedestrian's orientation, velocity, posture, or other gestures may indicate that the pedestrian is attempting to cross a street. The processing system may provide instructions to control the autonomous vehicle in response to determining the likely action that the object is performing. A particular instruction may be associated with a particular action being performed by the object. For the purposes of explanation, the object may be referred to herein as a vehicle. It should be understood that other objects may be present and considered by methods of the present application.

In some instances, the processing system utilizes decision trees to determine a likely action being performed by an object. The decision trees may indicate, for a particular set of input values, whether or not the object is performing a particular action. A decision tree includes a number of nodes arranged in a hierarchical tree structure that indicate a split on a threshold value of a particular attribute. These nodes may be referred to herein as "split decisions." Each split decision may be associated with a determination indicating whether or not the object is performing a particular action. Additionally, each split decision, except for the split decisions at the bottom of the decision tree hierarchy, includes at least one of a left and a right "child" split decision. A single path through the decision tree—which includes a combination of split decisions from the top of the decision tree to the bottom of the decision tree—may be referred to herein as an outcome. A particular outcome may be associated with a weighting indicative of an expected likelihood, which may be predetermined based on training data or a model of the scenario.

The processing system may receive the attribute measurements and the uncertainties associated with the attribute measurements and determine a likely outcome based on the received attribute and uncertainty values. In an example method of the present application, the processing system traverses the split decisions of the decision tree and determines a probability that an attribute measurement is below a threshold and a probability that the attribute measurement is above the threshold. The some of the determined probabilities may be statistically combined to determine a probability that a given outcome occurs. For example, the probabilities of each split decision of a given outcome may be multiplied together to form a compound probability indicating the probabilistic likelihood that the given outcome actually occurs. In some embodiments, the weighting associated with the given outcome may also be combined with the compound probabilities to determine a weighted likelihood that the particular outcome occurs. By determining a weighted likelihood of an outcome occurring, the determined outcome is not drastically affected by small perturbations in the measured attribute values. Thus, the instructions provided by the processing system do not rapidly change due to relatively small fluctuations in the measured attributes of the object.

As an example, sensors of an autonomous vehicle may measure the distance a nearby vehicle is from the center of its lane and the angle in which the nearby vehicle is oriented (indicating the yaw orientation of the nearby vehicle). In this example, the nearby vehicle being far from the center of its lane or the nearby vehicle being oriented at an angle may indicate that the nearby vehicle is changing lanes. In this scenario, each measurement may have some uncertainty associated with it resulting from the accuracy of the sensors or noise read in from the sensors. Additionally, the vehicle may be swaying slightly due to curvatures in the road or resulting from the manner in which a driver of the vehicle is operating the vehicle. The processing system may receive the measurements from the sensors and utilize a decision tree and the uncertainties associated with the measurements in order to determine whether or not the nearby vehicle is changing lanes. By considering the uncertainties associated with the measurements, the determination as to whether the vehicle is changing lanes is more robust and less susceptible to changing rapidly due to small variations in the measurements. As a result, the processing system may provide more accurate instructions to more safely control the autonomous vehicle.

In another embodiment, the uncertainty of the measurements may be incorporated within the decision tree. A typical decision tree—one that splits rigidly on feature values—may be modified based on training data to relax the splitting thresholds. By analyzing the training data, the variance, standard deviation, or other statistical metrics may be determined for each feature value. The variance of a feature value may indicate a range of values that are considered accurate. Small fluctuations in a measured feature value may be caused by noise, among other sources of inaccuracy. A feature's variance may then be used as a basis to modify the threshold values at which the split decisions bifurcate. Additional split decisions may also be added to a decision tree with relaxed split thresholds. These additional split decisions may provide a more fine gradation between the feature values and leaf nodes of the tree. The processing system may then provide instructions to control the vehicle corresponding to this determined most likely outcome.

A control system of the vehicle may responsively adjust the vehicle control when an object is determined to be performing a particular action. For example, the control system may alter a course of the vehicle or alter a speed of the vehicle. Additionally, the control system may record the attributes of the object nearby the autonomous vehicle. The control system may calculate vehicle control signals based on the measured attributes of the nearby object.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to capture an image with a camera in vehicle 100, analyze the image for the presence of a turn signal indicator, and responsively control vehicle 100 based on the presence of the turn signal indicator. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/ brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway map data 166, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116.

For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data 166 stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
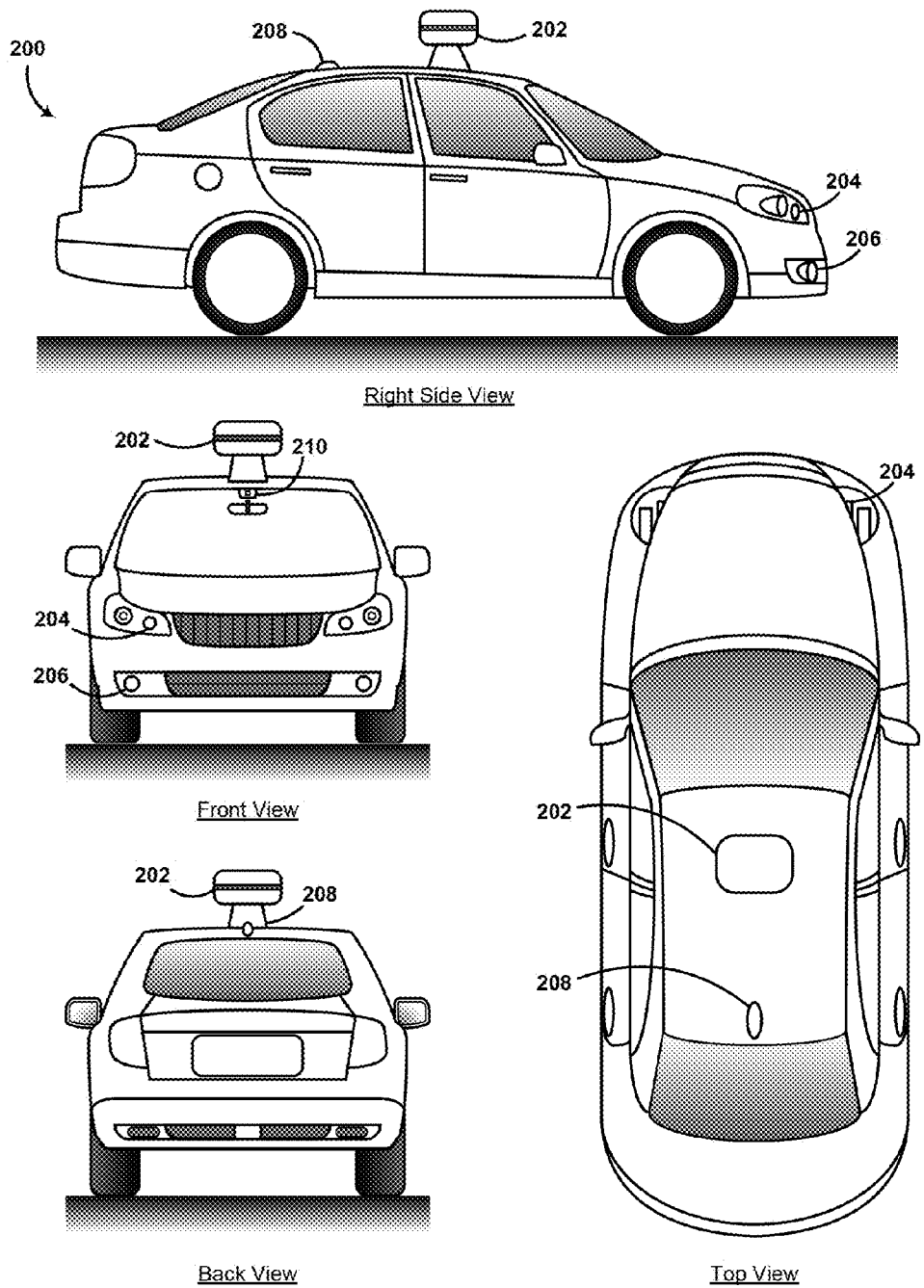
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 208, a radar 206, a laser rangefinder 204, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 204.

The wireless communication system 208 could be located as depicted in FIG. 2. Alternatively, the wireless communication system 208 could be located, fully or in part, elsewhere. The wireless communication system 208 may include wireless transmitters and receivers that could be configured to communicate with devices external or internal to the vehicle 200. Specifically, the wireless communication system 208 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
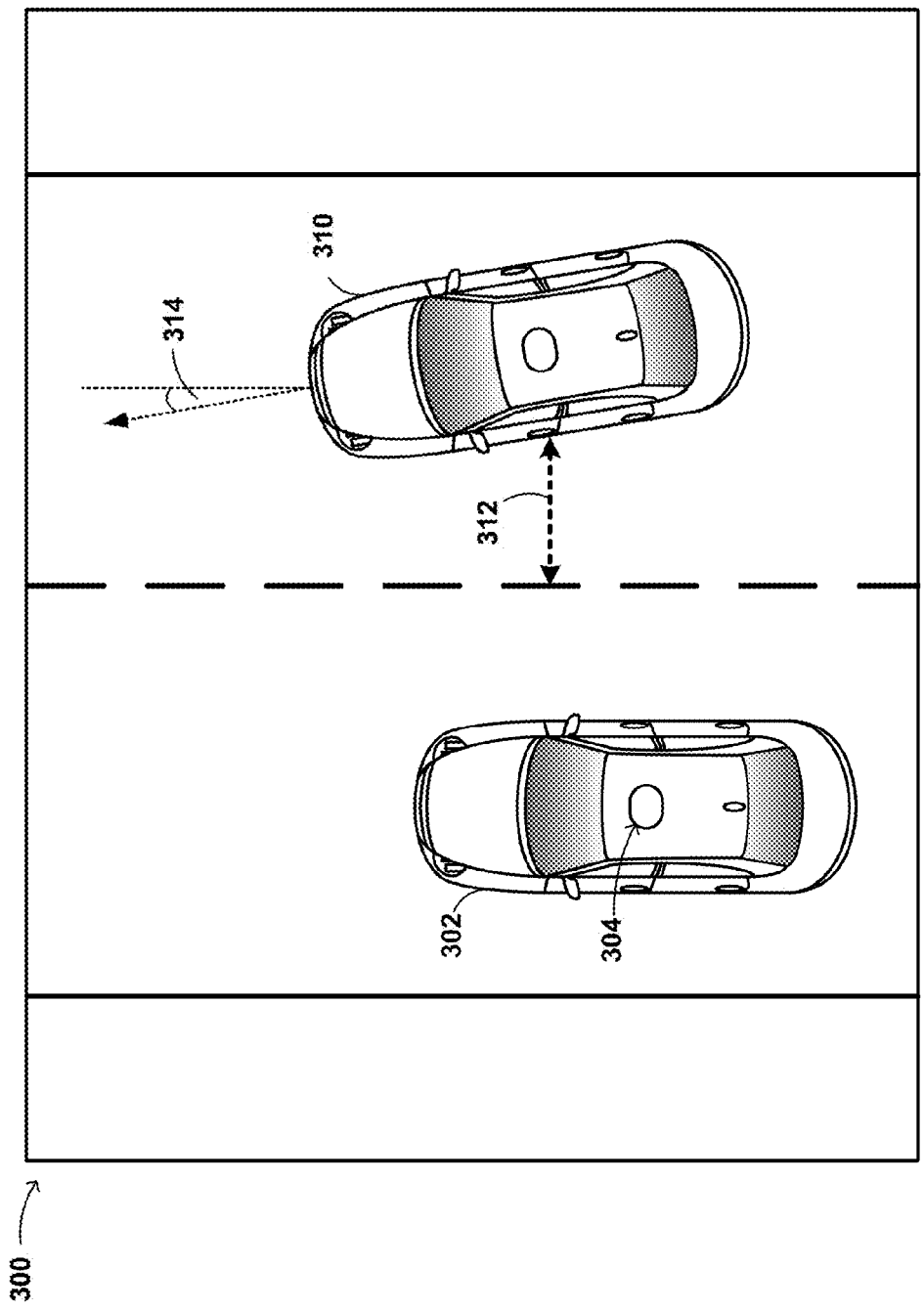
FIG. 3A illustrates an example scenario in which an example method may be carried out.

FIG. 3A illustrates an example scenario in which an example method may be carried out. The example scenario shown in FIG. 3A serves merely as an illustration and may vary in different scenarios. Similarly, other example situations or scenarios may exist as well. In the example scenario shown in FIG. 3A, a computing device associated with autonomous vehicle 302, whether in control or assisting the driver, may use one or more image-capture devices to capture images of the surrounding environment of the vehicle. For example, the image-capture devices may be built into the grill or front dashboard of the vehicle and capture images of the space including objects within the front path of the vehicle. Similarly, the image-capture devices may be placed in various places on the vehicle and may be configured to capture different portions of the environment around the vehicle. Additionally, the computing device associated with autonomous vehicle 302 may capture data from other sensors, such as a RADR or a LIDAR, which may be placed on the roof the vehicle in a sensor unit 304. The autonomous vehicle 302 in FIG. 3A may be similar or identical to vehicle 100 from FIG. 1 or vehicle 200 from FIG. 2. Components of vehicle 100 and vehicle 200 may also be included in the autonomous vehicle 302.

Although the computing device may be capable of determining objects, such as vehicles or pedestrians nearby the autonomous vehicle, processing may require time and/or resources from the computing device or other devices. Thus, as discussed above, the computing device may use additional information received from other sources coupled to or associated with the vehicle, such as RADAR, LIDAR, other cameras, GPS, or other various sensors in order to process the image. The computing device may receive information about various characteristics of the objects or the environment surrounding the vehicle from other sources. Based on the information received from other sources, the computing device may process images received from the image-capture device. The computing device may be configured to use characteristics of an object to determine a portion of the image that includes the object for the computing device to analyze. For example, the computing device may use the assisted image processing to find the visual features within the image that reveal information about the object. For example, the computing device may use image processing to locate a traffic light from an image and identify characteristics of that traffic light. Similarly, the computing device may be configured to determine approximate locations of objects within the image based on information received from other sources coupled to the vehicle.

In some examples, the computing device may receive information through a wired-connection or wirelessly from, for example, the wireless communication system 146. The wireless communication system may send and/or receive information that modifies aspects of the method of the present disclosure, such as various thresholds and machine-learning training data.

FIG. 3A illustrates an example scenario in which an example method may be performed to determine whether an object near the autonomous vehicle is performing a particular action. It should be understood that FIG. 3A illustrates an example scenario, and that other scenarios exist in which the example method is carried out. FIG. 3A depicts an autonomous vehicle 302 travelling on a road within a left lane and another vehicle 310 travelling on the road within the right lane. Although the road is depicted as having two lanes, the autonomous vehicle 302 may perform the example method at a road having any number of lanes, where any number of lanes may be on either side of the autonomous vehicle. Also, although the vehicle 310 depicted is a car, the autonomous vehicle 302 may perform the example method near other vehicles, such as trucks, motorcycles, and bicycles, among other vehicles. Further, although the vehicle 310 is positioned to the right of the autonomous vehicle 302, the vehicle 310 may be positioned in front, to the left, behind, or any other position near the autonomous vehicle 302. In addition, the vehicle 310 is depicted having a distance 312 from the edge of the lane and having an angle 314 relative to the direction of the road. The vehicle 310 may be oriented in other manners depending on the particular scenario. It should be understood that any combination of road lanes, vehicles, and respective orientations of the vehicles might be present in other example scenarios in which the example method may be performed.

In some embodiments, the processing system of the autonomous vehicle may determine whether an object is within a threshold distance of a vehicle. In some cases, measurements from sensors or determined from captured images or videos may only be reliable for objects within this threshold distance. If an object is beyond the threshold distance of the autonomous vehicle, it may or may not be considered in performing example methods of the present application. The distance of an object from the autonomous vehicle may be determined using a sensor, such as a RADAR, a LIDAR, or an ultrasonic sensor, among other sensors. The distance of an object from the autonomous vehicle may also be determined from captured images or videos using image processing techniques.

In some example scenarios, the autonomous vehicle 302 may detect multiple vehicles or other objects nearby the vehicle. In these example scenarios, the processing system may make multiple independent determinations as to the actions being performed by each object. The processing system may consider the multiple determinations in providing instructions to control the autonomous vehicle, so that the vehicle may operate safely in the presence of multiple nearby objects.

In some embodiments, the autonomous vehicle may repeat the determination as to whether an object is performing a particular action periodically, so that the instructions to control the vehicle may be provided quickly in response to the object performing the particular action.

Depending upon the determination as to whether an object is performing a particular action, the processing system may provide instructions to the control system of the autonomous vehicle to alter the vehicle's speed or direction. The particular speed in which the autonomous vehicle 302 is traveling may also be considered by the processing system in providing instructions to control the vehicle. As an example, the autonomous vehicle 302 may detect that a nearby vehicle is changing lanes into the lane currently occupied by the autonomous vehicle, and the autonomous vehicle 302 may determine a decrease in speed of the autonomous vehicle required to maintain a safe distance from the nearby vehicle and to avoid colliding with the nearby vehicle, and subsequently slow down the autonomous vehicle by the determined amount.

Although the scenario of FIG. 3A depicts an autonomous vehicle 302 and an autonomous vehicle 310 travelling on a two-lane road, other objects may be present that may or may not influence the operation of the autonomous vehicle. In some scenarios, the autonomous vehicle may be configured to perform other methods or processes in conjunction with the methods to determine whether or not an object is performing a particular action. These other methods or processes may determine the vehicle's location, speed, and the presence of objects sensed near the vehicle, among others, and may further modify the operation of the autonomous vehicle based on those determinations.

The methods of the present application may be carried out by a computer system, an image processing system, or a dedicated processing system coupled to an autonomous vehicle. For the purposes of explanation, and not to limit the scope of the present application, the following descriptions for FIG. 3B and FIG. 3C will describe the methods of the present application being performed by a "processing system."

Figure 3B:
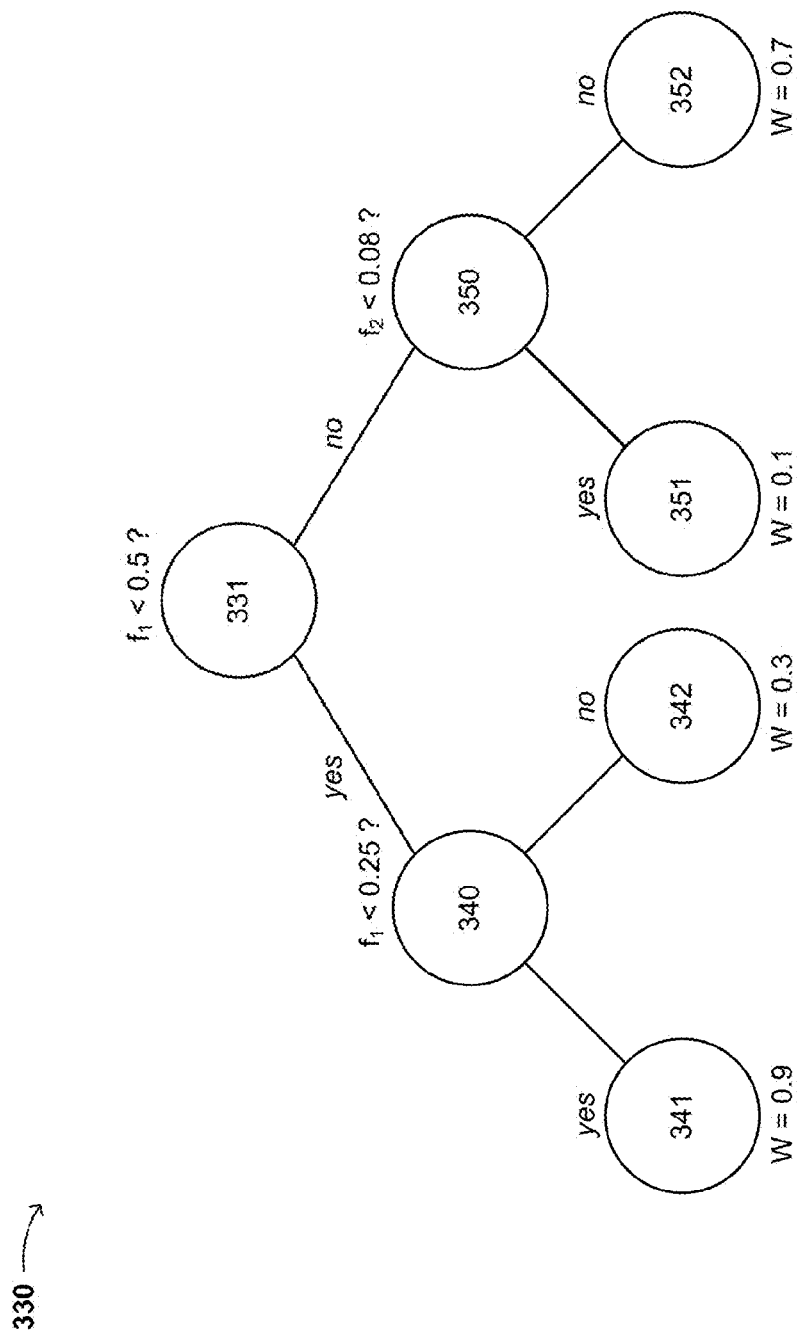
FIG. 3B illustrates an example decision tree.

FIG. 3B illustrates an example decision tree used to determine whether a nearby vehicle, such as nearby vehicle 310 in FIG. 3A, is changing lanes. The example decision trees depict the structure utilized in making the determination. Specific values, weightings, and variable names are present in the decision tree depicted in FIG. 3B. It should be understood that other values, weightings, and variable names may be present depending on the particular scenario or determination made by a particular decision tree. The specific values, weightings, and variable names are illustrated to aid in explaining embodiments of the method of the present application with respect to a particular determination. Further, the decision tree depicted in FIG. 3B has three hierarchical levels and seven nodes. It should be understood that any number of hierarchical levels and nodes may be present depending on the particular scenario or determination being made. In some cases, the tree may not a perfect tree (i.e. having the same number of nodes on either side of the root node of the tree). Any combination of tree configurations, values, variable names, and weighting may be used depending on the desired determination in a particular scenario.

For the purposes of explanation, each node of the decision tree may be referred to as a "split decision." The top of the tree may be referred to as the "root node" or "root split decision." A node at the bottom of the tree may be referred to as a "leaf node" or a "leaf split decision." The values indicated at the bottom of the decision tree labeled as "W=" may be referred to as "weightings." Further, a path through the decision tree indicating a combination of split decisions from the root split decision to a leaf split decision may be referred to as an "outcome."

FIG. 3B illustrates an example decision tree for determining whether or not a vehicle near the autonomous vehicle is changing lanes. Sensors of the autonomous vehicle may measure the nearby vehicle's distance 312 from the edge of the lane in meters, indicated by the variable $f_1$. The sensors may also measure the angle 314 of the nearby vehicle with respect to the direction of the road, indicated by the variable $f_2$. The processing system of the autonomous vehicle may also receive, or have stored on a memory of the processing system, variance values associated with $f_1$ and $f_2$ indicated by $\sigma_1^2$ and $\sigma_2^2$, respectively. Standard deviation values for the variance values may be determined by taking the square root of the variance values, resulting in $\sigma_1$ and $\sigma_2$, which may be used in addition to or alternatively to the variance values.

In the example decision tree 330, for a given set of attributes, probabilities may be determined for some or all of the split decisions, indicating a chance that the received attribute measurements lead to a particular determination. A given split decision may be associated with a particular determination. In the example depicted in FIG. 3B, a split decision may include a feature value at which to split. For example, at split decision 331, the processing system determines whether the measured feature value $f_1$ is less than 0.5. If measured feature value $f_1$ is less than 0.5 (indicated by "yes"), the processing system traverses to split decision 340. If the measured feature value $f_1$ is not less than 0.5 (indicated by "no"), the processing system traverses to split decision 350. The weightings specify the likelihood that the nearby vehicle is changing lanes without considering the variance in feature values; thus, they are used, along with the calculated probabilities at each split decision, to determine the probability that the nearby vehicle is changing lanes in light of the variance in measured feature values.

In the example decision tree 330, a set of attribute measurements (which may also be referred to herein as "feature values") may be used to determine a probability that a given outcome occurs. A given split decision specifies a threshold in which to split one of the feature values. By additionally considering the uncertainty associated with the feature value, the processing system can determine a probability that the feature value is actually below the threshold, or greater than or equal to the threshold. This determination of probabilities may be performed in a variety of ways, such as using a probability mass function, a probability density function, or a cumulative distribution function, among others. An example probability density function is depicted in FIG. 3C.

Figure 3C:
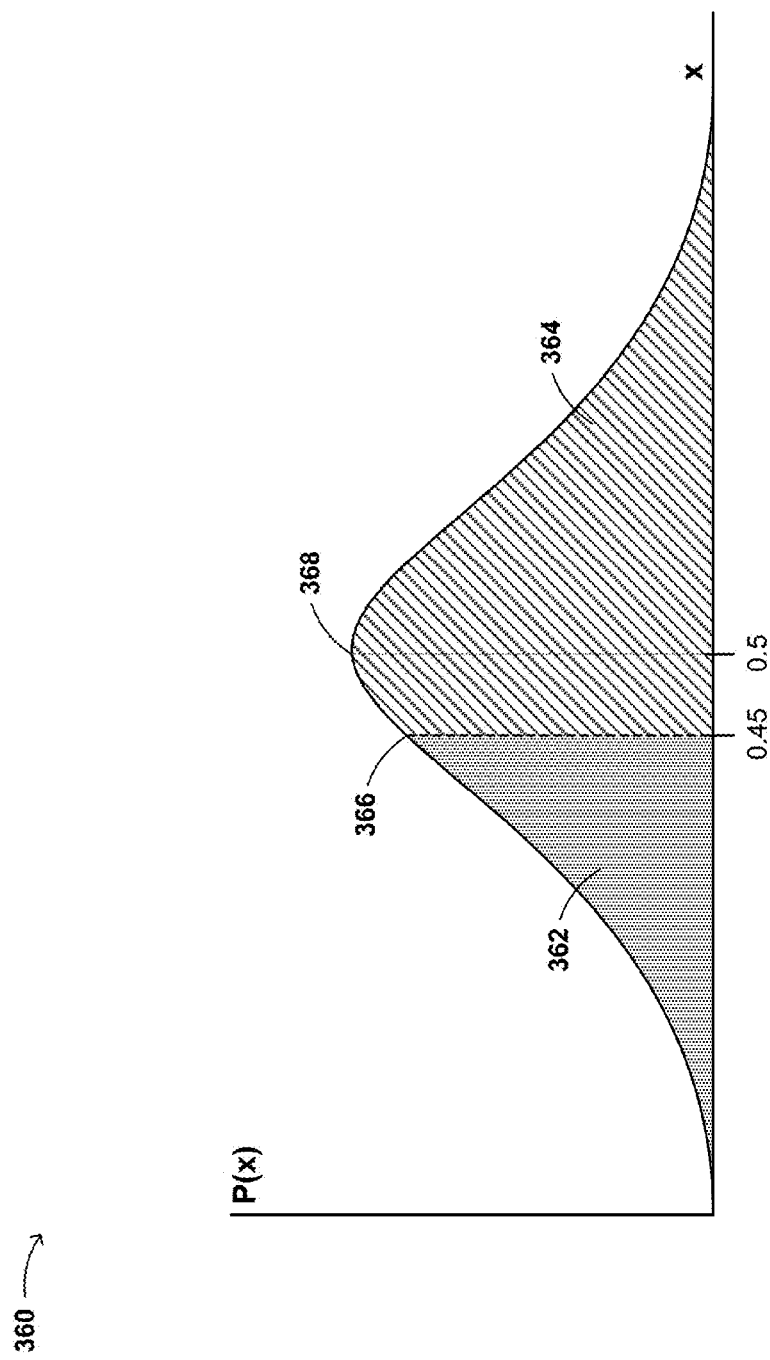
FIG. 3C illustrates an example probability distribution function.

The example probability density function 360 depicted in FIG. 3C illustrates an example way of determining the probabilities for a given split decision. The probability density function is formed as a Gaussian distribution using a threshold value for a particular feature value as the median and the variance associated with the particular feature value. In the depicted example, the threshold value is 0.5, and the received feature value is 0.45. To relate this to an example scenario, the threshold value for a given split decision in a decision tree used for determining whether a nearby vehicle is changing lanes might be 0.5 meters from the edge of the lane, and the received measurement of the nearby vehicle indicates that the nearby vehicle is 0.45 meters from the edge of the lane. The probability that the received measurement is less than the threshold 0.5 meters is equal to the area 364 underneath the probability density function. The probability that the received measurement is greater than or equal to the threshold 0.5 meters is equal to the area 362 underneath the probability density function. As may be visually observed, the area 364 is greater than the area 362, indicating that it is more likely that the received measurement is less than the threshold 0.5 meters from the edge. The probability measurements corresponding to the area 362 and the area 364 sum up to 1, so that either area represents a percentage chance that the received measurement is greater than, equal to, or less than the threshold value.

In some cases, the processing system utilizes a cumulative distribution function to reduce the computational complexity of determining the probabilities. Further, the cumulative distribution function may be stored as a lookup table in a memory of the processing system, so that the probabilities may be quickly estimated.

It should be noted that the probability density function 360 is depicted as having an example median and an example variance, and may not be necessarily drawn to scale. The probability density function 360 is presented for illustrative and explanatory purposes, and should not be construed as limiting aspects of the invention in any way.

Referring back to FIG. 3B, the processing system may determine probabilities for each of the split decisions using the above described methods. Then, compound probabilities may be calculated for each outcome of the decision tree. For instance, an outcome may include split decisions 331, 340, and 341. The processing system then determines the compound probability for that outcome by multiplying determined probabilities 331, 340, and 341. In some embodiments, the processing system may then multiply compound probability by the predetermined weighting associated with the outcome, which in this example is 0.9, to determine a weighted likelihood that the given outcome occurs. In this example, the processing system may then determine the weighted likelihoods one or more of the three remaining outcomes. In some cases, these likelihoods may be compared, and the processing system may provide instructions to control the vehicle that correspond to the most likely outcome (i.e. the outcome having the highest weighted likelihood).

Referring back to FIG. 3B, an example method of the present application is now described with respect to an example set of attribute measurements and variance values. Sensors of the autonomous vehicle may measure attribute value $f_1$ as being 0.26 meters from the edge of the lane, and $f_2$ as being at an angle of 0 degrees with respect to the direction of the road. In this example, attribute value $f_1$ has a variance of 0.0004, and attribute value $f_2$ has a variance of 0.0001. First, the processing system determines, at split decision 331, that the probability of $f_1<0.5$ as being approximately 1, as shown in equation (1), and the probability of $f_1 \geq 0.5$ as being approximately 0, as shown in equation (2), using a cumulative distribution function $\Phi$ with a mean of 0.5 and a variance of 0.0004. Note that "P(340)" represents the probability that the parent split decision 331 traverses to its left child node 340 ("yes") when attribute value $f_1$ is 0.26 (i.e. the probability that value $f_1$ is less than 0.5).

$$P(340) = P(f_1 < 0.5) = \Phi\left(\frac{0.5 - 0.26}{0.02}\right) \approx 1 \quad (1)$$

$$P(350) = P(f_1 \geq 0.5) = 1 - \Phi\left(\frac{0.5 - 0.26}{0.02}\right) \approx 0 \quad (2)$$

Because the probability that value $f_1$ is greater than or equal to 0.5 is approximately zero, probability calculations for split decisions 350, 351, and 352 are omitted. In some embodiments, these probabilities may be calculated. In other embodiments, when the probability of a certain split decision is below a threshold probability (e.g. less than 1%, among other threshold probabilities), the probabilities for the child nodes of that split decision may not be calculated.

Then, at split decision 340, the processing system determines the probability of the probability of $f_1<0.25$ as being approximately 0.31, as shown in equation (3), and the probability of $f_1 \geq 0.25$ as being approximately 0.69, as shown in equation (4) using a cumulative distribution function with a mean of 0.25 and a variance of 0.0004.

$$P(341) = \quad (3)$$
$$P(f_1 < 0.5) * P(f_1 < 0.25 \mid f_1 < 0.5) = 1 * \Phi\left(\frac{0.25 - 0.26}{0.02}\right) \approx 0.31$$

$$P(342) = P(f_1 < 0.5) * P(f_1 \geq 0.25 \mid f_1 < 0.5) = \quad (4)$$
$$1 * \left(1 - \Phi\left(\frac{0.25 - 0.26}{0.02}\right)\right) \approx 0.69$$

The processing system may then determine the weighted probability that the nearby vehicle is changing lanes (i.e. the weighted consolidated lane change likelihood). This calculation is shown in equation (5). Note that "W(341)" indicates the weighting associated with split decision 341. Also note that "P(341)" indicates the compound probability of reaching split decision 341. In other words, "P(X)"—the probability of reaching a particular split decision X—is the probability of the full traverse through the decision tree to X.

$$\frac{P(341) * W(341) + P(342) * W(342)}{P(341) + P(342)} = \frac{0.31 * 0.9 + 0.69 * 0.3}{0.31 + 0.69} = 0.486 \quad (5)$$

Thus, the weighted consolidated lane change likelihood is determined to be 0.486.

If the decision tree 330 were traversed as a typical decision tree without considering uncertainties in the feature values, a feature value $f_1$ of 0.26 would traverse from split decision 331, to the left to split decision 340, then to the right to split decision 342. This would result in the lane change likelihood being 0.3 (based on the weighting at split decision 342). Thus, by incorporating feature value uncertainties in probability calculations through decision tree 330, as a feature value approaches a split criterion (e.g. as $f_1$ approaches 0.25), the resulting weighted and consolidated lane change likelihood may more accurately predict whether or not the nearby vehicle is changing lanes. Comparatively, traversing a typical decision tree would result in the same lane change probability, regardless of how close a feature value is to a split criterion. The technique described with respect to FIG. 3B may be referred to herein as "inference."

It should be noted that the weightings for each outcome may be updated or otherwise modified in order to achieve a desired result. An autonomous vehicle may incorporate a wireless communication system that is capable of receiving new weightings that may result in a slight modification in the behavior of the vehicle.

In some embodiments, a decision tree may be generated based on training data. The training data may include example sets of feature values and respective labels associated with those feature values (which may be collectively referred to as "samples"). For example, when generating or training a lane change detection decision tree for the example scenario shown in FIG. 3A, the training data may include example sets of feature values {$f_1, f_2$} and a label for each example set of feature values indicating whether or not the specified values for $f_1$ and $f_2$ resulted in a lane change. The generating or training of such a decision tree may be carried out, for example, by a processing system coupled to an autonomous vehicle or by a computing system separate from the autonomous vehicle.

During a typical generation of or training of a decision tree, a computing system may consider a particular feature value (e.g. $f_1=0.5$) at which to split the samples to form the first split decision (i.e. root node) of the tree. The typical training process would then involve separating the samples into two disjoint sets—samples having $f_1<0.5$, and samples having $f_1 \geq 0.5$—that fall on either side of the split criteria of the root node of the tree. This "hard" splitting is then repeated on each of the disjoint sets for subsequent split criteria until the full decision tree is formed, where each leaf node of the tree is associated with a partition of the original set of samples. In this typical training process, each partition of the original set is non-overlapping, such that a given sample traverses along a single path of the tree and falls into a single leaf node. After the samples have been partitioned, the computing system may then compute, for each of the partitions of the original set of samples, a ratio of "lane change" labels to "not lane change" labels to determine the likelihood of a lane change for that combination of split decisions.

During a training process of the present application, a computing system may relax the boundaries along which samples are partitioned to allow these sets to overlap. For example, when considering a particular feature value (e.g.

$f_1=0.5$) at which to split the samples to form the first split decision (i.e. root node) of the tree, a training process of the present application may separate the samples into two overlapping sets—samples having $f_1<0.55$, and samples having $f_1>0.45$, for example. This "soft" splitting may consider the variances of the feature values and determine the extent of overlap based on the variances (e.g. overlap the sets by one standard deviation). By relaxing the boundary at which the samples are separated during training, samples having feature values that lie within the overlapping boundary are sent along both sides of the split decision; thus, the sets on either side of a split decision during training are no longer disjoint, as with the "hard" splitting of the typical training process.

The technique of relaxing the split criteria boundaries during training may be applied at each subsequent split decision during the training process of the present application. After each of the samples have been processed and placed at one or more leaf nodes of the generated decision tree, the computing system may determine the likelihood of a lane change for each leaf node (and thus each combination of split decisions) as the ratio of "lane change" labels to "not lane change" labels for the samples that fall within that leaf node.

As a result, a decision tree trained using a training process of the present application may have leaf node likelihoods (i.e. weightings) that are different compared to a decision tree generated using a typical training process. The decision tree trained using a training process of the present application may be more robust to noise in the feature values.

Note that the feature values and split criteria above are provided for explanatory purposes. Different feature values, variances, split decisions, and split criteria may be implemented as well.

In some embodiments, a decision tree may be generated using a training process of the present application that considers noise in the feature values. This decision tree may then be implemented on a processing system that, during operation, also performs the statistical inference of the present application. A decision tree that incorporates feature value noise at training time and at inference time may be even more robust to feature value noise.

Note that the values shown in FIG. 3B and FIG. 3C are merely example values, and may not necessarily correspond to actual split criteria used in determining the likelihood that a nearby vehicle is changing lanes. Any combination of feature values and split criteria may be implemented depending upon the particular use of the decision tree.

In some embodiments, a decision tree of the present application may be used for classification. For example, a decision tree may classify a nearby vehicle as "changing lanes" if the determined lane change likelihood exceeds a threshold likelihood (e.g. greater than 0.5, among other possible thresholds). In these embodiments, the processing system may compare the determined lane change likelihood to a threshold likelihood to determine whether to classify the nearby vehicle as "changing lanes" or "not changing lanes." Other classifications may also be possible.

It should be understood that the nearby vehicle lane change examples described herein are provided for explanatory purposes. The decision trees and other machine learning techniques of the present application may be applied to various situations involving a variety of sensors, vehicles, and objects.

The decision tree inference techniques and training techniques that incorporate feature value uncertainty may be applied in scenarios other than autonomous vehicles using information other than sensor data. Other fields that utilize statistical classification or decision making when input values have noise or other sources of uncertainty may employ the inference and training techniques of the present application to provide more robust classification and decision making. Other example applications of the inference and training techniques of the present application include, but are not limited to: computer vision, object recognition, natural language processing, speech recognition, handwriting recognition, search engines, among other possible applications.

It should be noted that the decision tree depicted in FIG. 3B is an illustrative depiction of a machine learning tool for making decisions. The processing system may perform the above-described likelihood calculations and other determinations using other decision support tools, algorithms, graphs, or models.

In some cases, the criterion for a particular split decision may consider multiple feature values. In other cases, the criterion for a particular split decision may split on a closed range of feature values, so that values that lie inside of the range move on to one child node and the values that lie outside of the range move on to another child node. Further, the criterion for a particular split decision may split on the received feature value being an exact value. Other split criteria may be implemented depending on the particular situation.

In some embodiments, the processing system performs the calculations of the probabilities sequentially. In other embodiments, the processing system performs the calculations of the probabilities in parallel.

An autonomous vehicle may include a wireless communication system configured to send and receive data. The wireless communication system may receive data for modifying or updating aspects of the method, such as the thresholds or weightings as described above.

It should be noted that the methods carried out by the processing system may be performed to determine whether any object (such as other vehicles, pedestrians, or animals, for example) is performing any action (moving in a particular direction, speeding up, or slowing down, for example). The particular decision tree, thresholds, and weightings may be altered or otherwise modified to apply the method to determining whether a particular object is performing a certain action.

Figure 4:
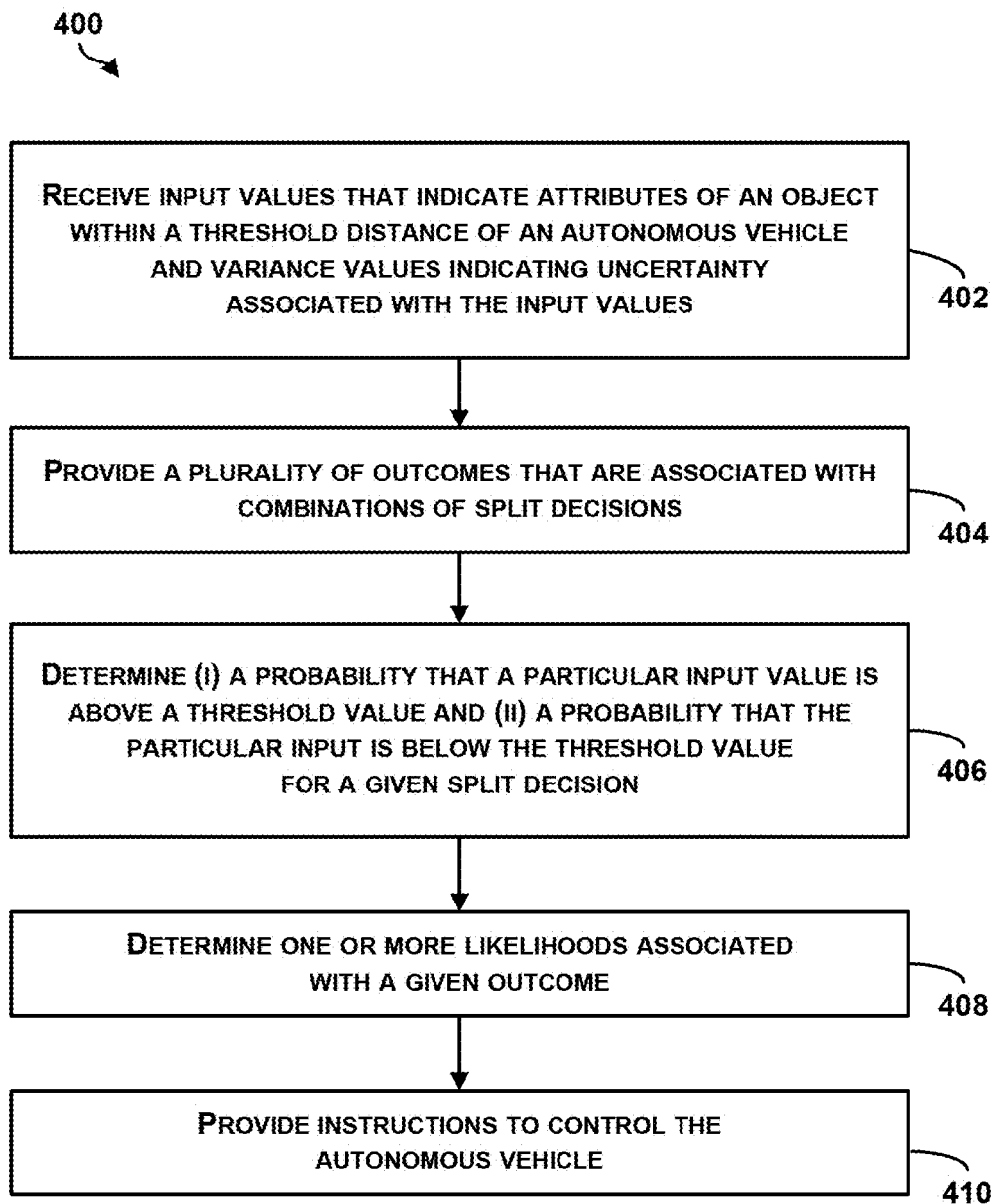
FIG. 4 illustrates an example method for real-time image-based traffic light detection.

FIG. 4 illustrates an example method 400 for determining whether or not an object is performing a particular action. A method 400 is provided for real-time sensor-based determinations as to whether an object is performing a particular action for an autonomous vehicle. The method could be performed to determining whether or not an object is performing a particular action from measurements taken from sensors, or from measurements determined from captured images and videos, similar to what was described with respect to FIG. 3A, FIG. 3B, and FIG. 3C; however, the method 400 is not limited to the scenarios shown in FIG. 3A, FIG. 3B, and FIG. 3C. FIG. 4 illustrates the blocks in an example method for real-time sensor-based detection as to whether an object near the autonomous vehicle is performing a particular action. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes receiving input values that indicate attributes of an object within a threshold distance of an autonomous vehicle and variance values indicating uncertainty associated with the input values. As previously discussed, the autonomous vehicle includes sensors and, in some cases, a camera. In some embodiments, the sensors are configured to measure attributes associated with an object that is near the autonomous vehicle. In other embodiments, the camera is configured to capture images or videos, and image processing may be used to determine attributes associated with the object that is near the autonomous vehicle. The attributes measured from the sensors or determined from the captured images or videos may be stored in a memory. At block 402, the processing system may receive the measured or otherwise determined attribute values from the memory. In additional embodiments, the measured or determined attributes are received at the processing system directly from the sensors or the camera. In either of the configurations the processing system receives attributes of an object that is nearby the vehicle. In some cases, the object is within a threshold distance of the vehicle. Further, the processing system may receive uncertainty values associated with the input values stored in a memory, or directly from the sensors or camera. If the received data corresponds to a video, a single frame may be extracted from the video to be processed. Additionally, multiple frames of a video may be analyzed sequentially or in parallel.

Block 404 includes providing a plurality of outcomes that are associated with combinations of split decisions. Each split decision indicates whether a particular input value is above or below a threshold value associated with the given split decision. This threshold value may be arbitrarily set to a particular value. The threshold value may also be predetermined using machine-learning training data. In some cases, the threshold value may be updated as a result of feedback from the processing system. In other cases, the threshold value may be updated or otherwise modified to be a threshold value received from an update to the system or a threshold value received at a wireless communication system of the autonomous vehicle. In some embodiments, the multiple thresholds may applied for a given split decision.

Block 406 includes determining a probability that a particular input value is above a threshold value and a probability that the particular input is below a threshold value for a given split decision. The probabilities may be determined using a probability mass function, a probability density function, or a cumulative distribution function as described above. The probability values may be computed on the processing system of the autonomous vehicle, or may be retrieved using a lookup table representing a cumulative distribution function.

Block 408 includes determining one or more likelihoods associated with a given outcome. A given outcome is determined based on the determined probabilities associated with the combination of split decisions indicated by the given outcome. In some embodiments, the determined likelihoods are weighted likelihoods, as previously described. In other embodiments, the determined likelihoods are consolidated likelihoods, as described above.

Block 410 includes providing instructions to control the autonomous vehicle. The provided instructions may correspond to a particular determination being made. For instance, if the processing system determines that a nearby vehicle is likely changing lanes into the lane currently occupied by the autonomous vehicle, the processing system may provide instructions to slow the vehicle down, so as to provide a safe distance between the autonomous vehicle and the nearby vehicle. In the case where the nearby vehicle is determined to not be changing lanes, the processing system may continue on a predetermined path or otherwise not alter the speed or direction in which the autonomous vehicle is travelling.

In some instances, the instructions may be provided to a control system of an autonomous vehicle. The instructions may correspond with a particular path and a manner in which the vehicle travels along the particular path. The control system may cause the vehicle to travel along the particular path in the determined manner by adjusting the throttle, brake, steering, and other systems that influence the speed and direction of the vehicle. The control system may modify the vehicle's translational velocity, rotational velocity, or both based on the provided instructions. One or more instructions may correspond to a determination as to whether or not an object near the autonomous vehicle is performing a particular action. In some instances, the particular instruction provided to the control system is influenced by the speed and direction in which the vehicle is traveling, in addition to the determined states of traffic. In various embodiments, the determination as to whether an object near the autonomous vehicle is performing a particular action may influence the operation of the autonomous vehicle, along with other factors such as objects near the vehicle.

Figure 5:
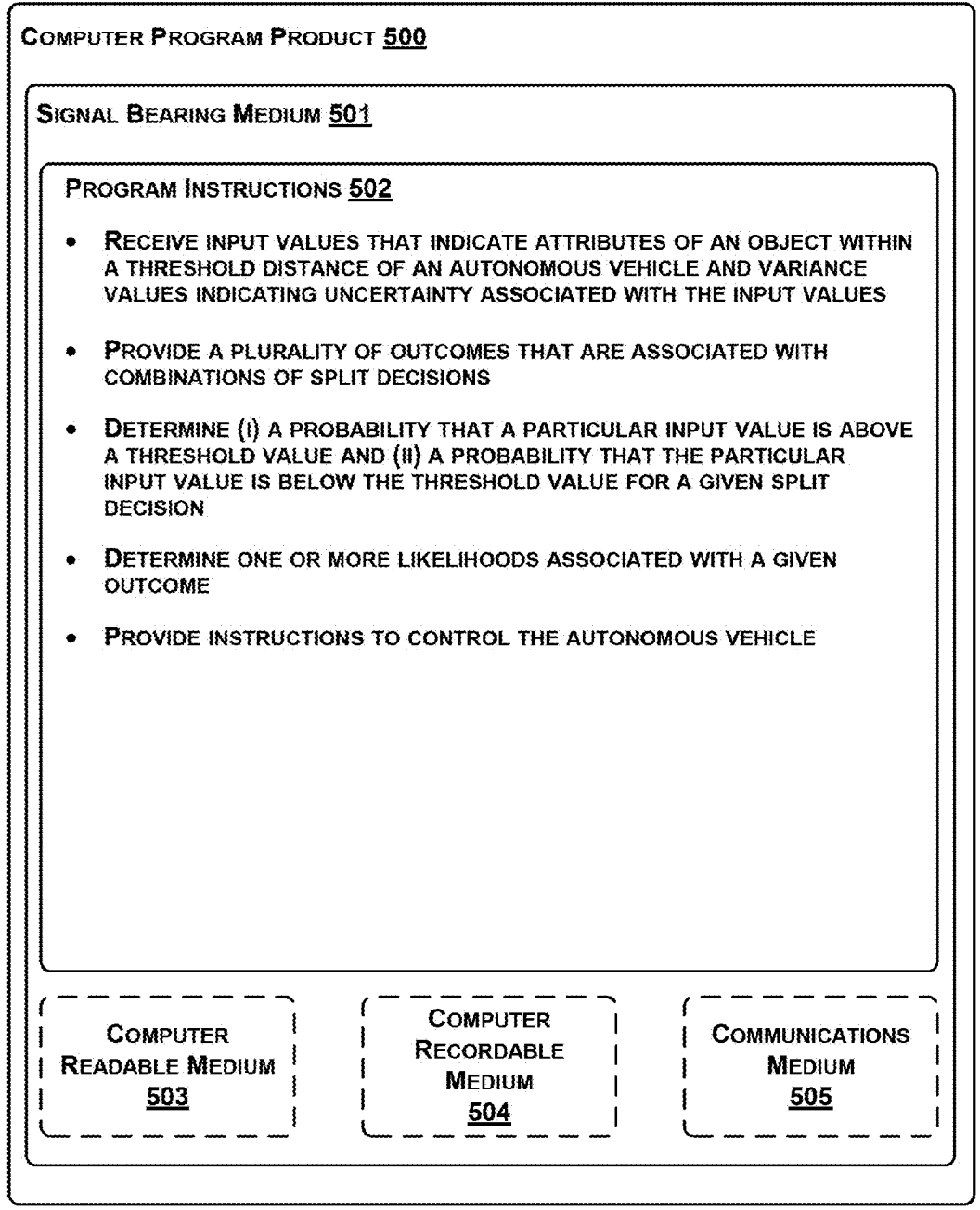
FIG. 5 illustrates an example computer readable medium configured for real-time image-based traffic light detection.

In some embodiments, the disclosed methods may be implemented as computer program instructions encoded on a computer-readable storage media in a machine-readable format, or on other non-transitory media or articles of manufacture. FIG. 5 illustrates an example computer readable medium in the form of a computer program product 500 that includes a computer program for executing a computer process on a computing device, arranged for real-time image-based car detection. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 4, one or more features of blocks 402-412 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   determining, for a given split decision from among a plurality of split decisions, a probability that an input value is below a threshold value associated with the given split decision based on the input value and a variance value associated with the input value, wherein the input value indicates an attribute of an object proximate to an autonomous vehicle;
   determining one or more likelihoods associated with a given outcome of a plurality of outcomes, wherein a given outcome is associated with one or more split decisions of the plurality of split decisions, and wherein a given likelihood is determined based on the determined probabilities associated with the one or more split decisions associated with the given outcome; and
   based on the determined one or more likelihoods, executing instructions by a computing device to control the autonomous vehicle.

2. The method of claim 1, wherein determining, for the given split decision, the probability that the particular input value is below the threshold value comprises:
   determining, for the given split decision, a cumulative distribution function based on the threshold value and the variance value corresponding to the input value, wherein the cumulative distribution function indicates a probability that a certain input value is less than or equal to the threshold value; and
   determining, for the given split decision, the probability that the input value is below the threshold value associated with the given split decision using the determined cumulative distribution function.

3. The method of claim 1, wherein determining the one or more likelihoods comprises:
   determining one or more compound probabilities, wherein a given compound probability corresponds to the given outcome, and wherein the given compound probability corresponds to a product of the determined probabilities associated with the one or more split decisions associated with the given outcome;
   receiving one or more weightings, wherein a given weighting corresponds to the given outcome; and
   determining the one or more likelihoods based on the corresponding one or more compound probabilities and the corresponding one or more weightings.

4. The method of claim 3, wherein determining the one or more likelihoods based on the corresponding one or more compound probabilities and the corresponding one or more weightings comprises:
   determining one or more linear combinations of the one or more compound probabilities and the corresponding one or more weightings;
   determining one or more sums of the one or more compound probabilities; and
   determining the one or more likelihoods as a quotient of a given linear combination and a given sum.

5. The method of claim 1, wherein providing instructions executable by the computing device to control the autonomous vehicle comprises:
   determining whether the attributes of the object proximate to the autonomous vehicle indicate that the object is moving toward a particular location based on the determined one or more likelihoods; and
   based on determining that the attributes of the object indicate that the object is moving toward the particular location, providing instructions executable by the computing device to control the autonomous vehicle.

6. The method of claim 1, wherein providing instructions executable by the computing device to control the autonomous vehicle comprises:
   providing instructions executable by the computing device to control at least one of a speed and a direction of the autonomous vehicle to avoid a collision with the object.

7. The method of claim 1, further comprising:
   receiving training data that includes a plurality of input values corresponding to an attribute of the object proximate to the autonomous vehicle; and
   determining a threshold value associated with the given split decision based on the received training data.

8. A non-transitory computer-readable medium having stored thereon instructions that, upon execution by at least one processor of a computing device coupled to an autonomous vehicle, cause the computing device to perform functions comprising:
   receiving training data indicative of a plurality of samples, wherein the samples include sets of feature values and respective labels associated with the sets of feature values, wherein a given set of feature values indicates attributes of an object within a threshold distance of the autonomous vehicle, and wherein a given label indicates whether or not the object performed a particular action;
   providing a plurality of outcomes, wherein a given outcome is associated with a combination of split decisions, wherein a given split decision indicates whether a particular feature value associated with the given attribute is above or below a threshold value associated with the given split decision;
   determining subsets of the plurality of samples associated with respective outcomes, wherein at least two of the subsets share at least one common sample;
   determining likelihoods associated with respective outcomes, wherein a given likelihood indicates that the object is performing a particular action, and wherein the given likelihood associated with a given outcome is determined based on the labels of the samples in the subset associated with the given outcome;

determining a particular outcome from the plurality of outcomes that corresponds to a set of input value measurements, wherein the set of input value measurements indicates attributes of the object within the threshold distance of the autonomous vehicle; and executing instructions by the computing device to control the autonomous vehicle based on the likelihood associated with the particular outcome.

9. The non-transitory computer-readable medium of claim 8, wherein determining subsets of the plurality of samples associated with respective outcomes comprises:

determining, for a given split decision, a first subset of samples and a second subset of samples from the plurality of samples, wherein the first subset includes samples from the plurality of samples with a particular feature value that is less than a first threshold, wherein the second subset includes samples from the plurality of samples that with the particular feature value that exceeds a second threshold, and wherein the first threshold is greater than the second threshold.

10. The non-transitory computer-readable medium of claim 9, further comprising:

determining variances for respective attributes based on the received training data, wherein a given variance indicates an uncertainty associated with a given attribute; and determining the first threshold and the second threshold based on the determined variances.

11. The non-transitory computer-readable medium of claim 8, further comprising:

determining that the object is not moving toward the autonomous vehicle based on the determined likelihood not exceeding a predetermined threshold likelihood.

12. The non-transitory computer-readable medium of claim 8, wherein the particular outcome indicates that the object is moving toward the autonomous vehicle, and wherein the provided instructions control the autonomous vehicle to avoid coming in contact with the object.

13. The non-transitory computer-readable medium of claim 8, wherein providing instructions executable by the computing device to control the autonomous vehicle comprises:

providing instructions executable by the computing device to control at least one of a speed and a direction of the autonomous vehicle to avoid a collision with the object.

14. A system comprising:
an autonomous vehicle;
at least one sensor configured to determine attributes of an object proximate to the autonomous vehicle;
a computing device comprising at least one processor; and
a non-transitory computer-readable medium having stored thereon instructions that, upon execution by the at least one processor, cause the computing device to perform functions comprising:

determining, for a given split decision from among a plurality of split decisions, a probability that an input value meets a criterion associated with the given split decision based on the input value and a variance value associated with the input value, wherein the input value indicates an attribute of an object proximate to an autonomous vehicle;

determining one or more likelihoods associated with a given outcome of a plurality of outcomes, wherein a given outcome is associated with one or more split decisions of the plurality of split decisions, and wherein a given likelihood is determined based on the determined probabilities associated with the one or more split decisions associated with the given outcome; and based on the determined one or more likelihoods, executing instructions by the computing device to control the autonomous vehicle.

15. The system of claim 14, wherein determining the one or more likelihoods comprises:

determining, for the given split decision of the given outcome, whether the probability that the input value meets the criterion exceeds a threshold probability; and based on the determined probability being below the threshold probability, determining the given likelihood associated with the given outcome as the determined probability that the particular input value meets the criterion.

16. The system of claim 14, wherein the criterion associated with the given split decision indicates (i) whether the input value is above a first threshold value associated with the given split decision and (ii) whether the input value is below a second threshold value associated with the given split decision.

17. The system of claim 16, wherein the first threshold value is greater than the second threshold value.

18. The system of claim 14, wherein the functions further comprise:

receiving a request to maneuver the autonomous vehicle to a particular location;

determining whether the attributes of the object proximate to the autonomous vehicle indicate that the object will be within a threshold distance of the particular location within a particular range of time based on the determined one or more likelihoods; and based on determining that the attributes of the object proximate to the autonomous vehicle indicate that the object will not be within the threshold distance of the particular location within the particular range of time, providing instructions executable by the computing device to move the autonomous vehicle to the particular location.

19. The system of claim 14, wherein providing instructions executable by the computing device to control the autonomous vehicle comprises:

determining whether the attributes of the object proximate to the autonomous vehicle indicate that the object is moving toward a particular location based on the determined one or more likelihoods; and based on determining that the attributes of the object indicate that the object is not moving toward a particular location, providing instructions executable by the computing device to control the autonomous vehicle.

20. The system of claim 14, wherein the functions further comprise:

determining a length of time since providing the instructions executable by the computing device to control the autonomous vehicle; and based on the length of time exceeding a threshold length of time, repeating the functions of (i) determining the probability that the particular input value meets the criterion, (ii) determining the one or more likelihoods, and (iii) providing the instructions executable by the computing device to control the autonomous vehicle.

* * * * *